United States Patent
Coster et al.

(10) Patent No.: US 6,979,662 B1
(45) Date of Patent: Dec. 27, 2005

(54) COLORED SODA-LIME GLASS

(75) Inventors: Dominique Coster, Temploux (BE); Laurent Delmotte, Meeffe (BE); Marc Foguenne, Saint-Denis (BE)

(73) Assignee: Glaverbel, Brussels (BE)

( * ) Notice: Subject to any disclaimer, the term of this patent is extended or adjusted under 35 U.S.C. 154(b) by 0 days.

(21) Appl. No.: 10/110,078

(22) PCT Filed: Oct. 4, 2000

(86) PCT No.: PCT/EP00/09756

§ 371 (c)(1),
(2), (4) Date: May 24, 2002

(87) PCT Pub. No.: WO01/25160

PCT Pub. Date: Apr. 12, 2001

(30) Foreign Application Priority Data

Oct. 6, 1999 (WO) .................. PCT/EP99/07467

(51) Int. Cl.$^7$ ............................................. C03C 3/087
(52) U.S. Cl. ...................................................... 501/71
(58) Field of Search .................................... 501/70, 71

(56) References Cited

U.S. PATENT DOCUMENTS

| | | | |
|---|---|---|---|
| 4,866,010 A | | 9/1989 | Boulos et al. |
| 5,780,372 A | * | 7/1998 | Higby .................. 501/70 |
| 5,851,940 A | * | 12/1998 | Boulos et al. ......... 501/71 |
| 5,877,103 A | | 3/1999 | Dupont et al. |
| 6,071,840 A | * | 6/2000 | Sasage et al. ......... 501/71 |
| 6,103,650 A | * | 8/2000 | Krumwiede ........... 501/71 |
| 6,335,299 B1 | * | 1/2002 | Foguenne et al. ..... 501/71 |
| 6,413,893 B1 | * | 7/2002 | Shelestak et al. ..... 501/71 |

FOREIGN PATENT DOCUMENTS

| | | | | |
|---|---|---|---|---|
| EP | 0 820 964 | | 1/1998 | |
| FR | 2 738 240 | | 3/1997 | |
| JP | 08 245238 | | 9/1996 | |
| WO | WO 9717303 A1 | * | 5/1997 | ...... C03C 4/02 |
| WO | 97 30948 | | 8/1997 | |
| WO | 99 05069 | | 2/1999 | |
| WO | WO 9958462 A2 | * | 11/1999 | |

* cited by examiner

*Primary Examiner*—Karl Group
(74) *Attorney, Agent, or Firm*—DLA Piper Rudnick Gray Cary US LLP

(57) ABSTRACT

The invention concerns a colored soda-lime glass comprising an amount of MgO more than 2%, an amount of $Fe_2O_3$ less than 1.1%, and amount of $MnO_2$ less than 1300 ppm, an amount of Co more that 55 ppm and it has a selectivity (SE4) higher than 1.2 and a dominant wavelength $\lambda_D$ not exceeding 490 nm and excitation purity (P) more than 10%. Said glass is particularly suited for rear side windows, back windows and glass sun roofs for motor vehicle.

21 Claims, No Drawings

COLORED SODA-LIME GLASS

CROSS-REFERENCE TO RELATED APPLICATIONS

This application claims priority from PCT Application No. PCT/EPOO/09756 filed 4 Oct. 2000, which is based upon and claims priority from PCT Application No. PCT/EP99/07467 filed 6 Oct. 1999, both of which are hereby incorporated by reference.

BACKGROUND OF THE INVENTION

The present invention relates to a coloured soda-lime glass comprising the main glass-forming constituents and colouring agents.

The term "soda-lime glass" is used in the broad sense here and relates to any glass containing the following constituents, the quantity of which is expressed as a percentage relative to the total weight of glass:

| | |
|---|---|
| $Na_2O$ | 10 to 20% |
| CaO | 0 to 16% |
| $SiO_2$ | 60 to 75% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20%. |

This type of glass is very widely used, for example, in the glazing for the building or automotive sector. It is currently manufactured in ribbon form using the float process. Such a ribbon can be cut into sheets which can then be bended or subjected to a treatment to reinforce their mechanical properties, e.g. thermal toughening.

It is generally necessary to relate the optical properties of a glass sheet to a standard illuminant. In the present description 2 standard illuminants are used: illuminant C and illuminant A as defined by the Commission Internationale de l'Éclairage (CIE). Illuminant C represents the average daylight having a colour temperature of 6700 K. This illuminant is especially suitable for evaluating the optical properties of glazing intended for building as well as the colour of glazing for motor vehicles. Illuminant A represents the radiation of a Planck radiator at a temperature of about 2856 K. This illuminant represents the light emitted by vehicle headlights and is essentially intended for evaluation of the optical properties of glazing intended for motor vehicles. The Commission Internationale de l'Éclairage has also published a document entitled "Colorimétrie, Recommandations Officielles de la C.I.E." [Colorimetry, Official Recommendations of the CIE], (May 1970) which describes a theory according to which colorimetric coordinates for the light of every wavelength of the visible spectrum are defined so that they can be represented on a diagram with orthogonal axes x and y, referred to as the CIE 1931 trichromatic diagram. This trichromatic diagram shows the representative location of the light of every wavelength (expressed in nanometres) of the visible spectrum. This location is referred to as the "spectrum locus" and the light with coordinates located on this spectrum locus is said to have 100% excitation purity with the appropriate wavelength. The spectrum locus is completed by a light called the purple boundary which joins the ends of the spectrum locus with coordinates corresponding to wavelengths 380 nm (violet) and 780 nm (red). The area contained between the spectrum locus and the purple boundary is that available for the trichromatic coordinates of all visible light. The coordinates of light emitted by illuminant C, for example, correspond to x=0.3101 and y= 0.3162. This point C is considered to represent white light and therefore has an excitation purity equal to zero for any wavelength. Lines can be drawn from point C towards the spectrum locus and any required wavelength, and any point located on these lines can be defined not only by its coordinates x and y, but also as a function of the wavelength corresponding to the line on which it is located and its distance from point C relative to the total length of the wavelength line. Consequently, the hue of the light transmitted by a coloured glass sheet can be described by its dominant wavelength and its excitation purity expressed as a percentage.

The CIE coordinates of light transmitted by a coloured glass sheet will depend not only on the composition of the glass but also on its thickness. In the present description as well as in the claims, all the excitation purity P and dominant wavelength $\lambda_D$ values of the transmitted light are calculated on the basis of the specific internal spectral transmission factors ($TSI_\lambda$) of a 5 mm thick glass sheet with illuminant C at a solid angle of observation of 2°. The specific internal spectral transmission factor of a glass sheet is ruled solely by the absorption of the glass and can be expressed by Beer-Lambert's law:

$TSI_\lambda = e^{EA\lambda}$ where $A_\lambda$ is the absorption coefficient of the glass (in $cm^{-1}$) at the considered wavelength, and E the thickness of the glass (in cm). In a first approximation, $TSI_\lambda$ can also be represented by the formula $(I_3+R_2)/(I_1-R_1)$ where $I_1$, is the intensity of the incident visible light on a first face of the glass sheet, $R_1$ is the intensity of the visible light reflected by this face, $I_3$ is the intensity of the visible light transmitted from the second face of the glass sheet, and $R_2$ is the intensity of the visible light reflected towards the interior of the sheet by this second face.

The colour rendition index (R), expressed by a number in the range of between 1 and 100, denotes the difference between a colour and the perception that an observer has of it when he/she looks through a coloured transparent screen. The more significant this difference is, the lower the rendition index of the colour in question will become. With a constant wavelength $\lambda_D$, when the purity of the colour of the glass increases, the colour rendition index perceived through this glass decreases. The colour rendition index is calculated according to the standard EN 410. We will refer below to the rendition index of the colour yellow ($R_j$) of a glass which denotes the distortions of this colour in relation to the colour perceived by an observer looking through this glass.

The following are also used in the following description as well as the claims:
  the total light transmission with illuminant A (TLA) measured for a thickness of 4 mm (TLA4) at a solid angle of observation of 2°. This total transmission is the result of integration between the wavelengths of 380 and 780 nm of the term: $\Sigma T_\lambda . E_\lambda . S_\lambda / \Sigma E_\lambda . S_\lambda$, in which $T_\lambda$ is the transmission at wavelength $\lambda$, $E_\lambda$ is the spectral distribution of illuminant A and $S_\lambda$ is the sensitivity of the normal human eye as a function of wavelength $\lambda$;
  the total energy transmission (TE), measured with a thickness of 4 mm (TE4). This total transmission is the result of integration between the wavelengths of 300 and 2500 nm of the term: $\Sigma\ T_\lambda.E_\lambda/\Sigma\ E_\lambda$. The energy distribution $E_\lambda$ is the spectral energy distribution of the sun at 30° above the horizon, with an air mass equal to 2 and an inclination of the glazing relative to the horizontal of 60°. This distribution, referred to as "Moon distribution", is defined in the standard ISO 9050.

selectivity (SE), measured by the ratio of total light transmission for illuminant A to total energy transmission (TLA/TE);

total ultraviolet transmission, measured for a thickness of 4 mm (TUV4). This total transmission is the result of the integration between 280 and 380 nm of the term $\Sigma\ T_\lambda.U_\lambda/\Sigma\ U_\lambda$, in which $U_\lambda$ is the spectral distribution of the ultraviolet radiation which has crossed the atmosphere determined in the standard DIN 67507;

the $Fe^{2+}$/total Fe ratio, sometimes referred to as the redox ratio, which represents the value of the ratio in atomic weight of $Fe^{2+}$ relative to the total weight of iron atoms present in the glass, and which is obtained by the formula:

$$Fe_{2+}/Fe_{total}=[24.4495 \times \log(92/\tau_{1050})]/t\text{-}_{Fe2O3}$$

where $\tau_{1050}$ represents the specific internal transmission factor of the glass of 5 mm at the wavelength 1050 nm. $t\text{-}_{Fe2O3}$ represents the total content of iron expressed in the form of oxide $Fe_2O_3$ and measured via X-ray fluorescence.

SUMMARY OF THE INVENTION

The present invention relates to blue glasses in particular. These glasses can be used in architectural applications and as glazing in railway carriages and motor vehicles. In the architectural application, glass sheets 4 to 6 mm thick will generally be used while in the automotive field thicknesses of 1 to 5 mm are currently applied, in particular for the formation of glazing for side windows and opening roofs.

The invention relates to a coloured soda-lime glass comprising the main glass-forming constituents and colouring agents, characterised in that it comprises:

i) a quantity of MgO expressed relative to the total weight of glass which is more than 2%, ii) a quantity of $MnO_2$ expressed relative to the total weight of glass which is less than 1300 parts per million, iii) a quantity of $Fe_2O_3$ expressed relative to the total weight of glass which is less than 1.1%, the total quantity of iron being expressed in the form of $Fe_2O_3$, iv) a quantity of Co expressed relative to the total weight of glass which is more than 55 parts per million, and in that it has v) a selectivity (SE4) greater than 1.2, vi) a dominant wavelength ($\lambda_D$) less than or equal to 490 mm, and vii) excitation purity greater than 10%.

This combination of compositions and properties is advantageous in that it allows a particularly aesthetically pleasing colour to be provided while assuring an increased selectivity which enables the restriction of interior heating of the spaces defined by glazing units according to the invention.

It is desirable that the main constituents for forming the glass according to the invention contain a concentration of MgO of more than 2% by weight relative to the total weight of glass, since this compound promotes the fusion of its constituents during the glass melt.

The energy and optical properties of a glass containing several colouring agents result from a complex interaction between these agents. In fact, these colouring agents exhibit a behaviour which is heavily dependent on their oxidation state and therefore on other elements likely to influence this state.

Iron is present in the majority of glasses available on the market, especially in coloured glasses. The presence of $Fe^{3+}$ provides the glass with a slight absorption of visible light at low wavelength (410 and 440 nm) and a very strong absorption band in the ultraviolet range (absorption band centred at 380 nm), while the presence of $Fe^{2+}$ causes strong absorption in the infrared range (absorption band centred at 1050 nm). The presence of $Fe^{3+}$ provides the glass with a light yellow coloration, generally regarded as not very pleasing, while ferrous ions, $Fe^{2+}$, provide a pronounced blue-green coloration. A strong concentration of $Fe^{2+}$ in the glass therefore allows the energy transmission TE to be reduced and a pleasing coloration to be provided. However, the presence of iron in the bath of molten glass causes an absorption of infrared radiation which can hinder the heat diffusion in the glass production furnace and therefore make this production more difficult. Moreover, when the concentration of iron increases, the light transmission of the glass decreases.

The glass according to the invention contains less than 1.1% of $Fe_2O_3$ relative to the total weight of glass, and preferably less than 1.0%. This iron content allows the glass according to the invention to be produced in a traditional large-capacity furnace.

Advantageously, the glass according to the invention contains ferrous iron in a quantity, expressed in the weight of atoms of $Fe^{2+}$ relative to the total weight of iron atoms present in the glass, which is greater than 28% ($Fe^{2+}$/total Fe ratio), preferably greater that 32%, and preferably greater than 35%. This ratio enables a glass with a low TE and high selectivity to be obtained.

The glass according to the invention contains less than 1300 parts per million (ppm) of $MnO_2$ relative to the total weight of glass. The oxidising character of $MnO_2$ may influence the redox state of the iron, reduce the selectivity of the glass and also result in a violet hue.

The glass according to the invention contains more than 55 parts per million of Co relative to the total weight of glass, advantageously more than 60 parts per million of Co, and preferably more than 70 parts per million of Co. The higher the Co content, the more the blue colour of the glass is accentuated.

In preferred forms, the glass according to the invention has a rendition index for the colour yellow ($R_j$) greater than 98.5−0.74×P, preferably greater than 101−0.74×P, and preferably greater than 104−0.74×P. These relations result, with a given purity of the glass, in very low distortions of the colour yellow as perceived by an observer through a glass sheet according to the invention.

Since the human eye is particularly sensitive to the colour yellow, a high value of the rendition index for this colour denotes that an observer has a particularly natural perception of his/her environment as seen through a glass sheet according to the invention.

Equally, the glass according to the invention preferably has a TUV4 of less than 30%. Such a value allows significant discoloration of objects situated in a space defined by a glazed surface composed of the glass according to the invention to be prevented. This property is particularly advantageous in the automotive-sector. A low ultraviolet radiation transmission factor in fact enables the ageing and discoloration of interior fittings of the vehicles which have been exposed to the effects of the sun to be prevented.

It is desirable that the glass according to the invention has a TLA4 of less than 70%, preferably less than 65%, and preferably less than 60%, this making it particularly suitable for applications such as the formation of rear windows, rear side windows and glazed roofs in motor vehicles.

It is preferred that the glass according to the invention contains more than 0.5% by weight of $Fe_2O_3$ (total iron), preferably more than 0.6%, and preferably more than 0.7% by weight of $Fe_2O_3$. Such contents enable a high selectivity of the glass to be achieved.

Furthermore, in the forms preferred according to the invention, the glass has a selectivity higher than 1.3, preferably higher than 1.4, and preferably higher than 1.5.

This is particularly advantageous in terms of reducing the heating in spaces defined by glazing units made with glass according to the invention.

Preferably, the glass according to the invention has a dominant wavelength ($\lambda_D$) and excitation purity (P) which, in a CIE 1931 trichromatic diagram, are located inside a triangle, wherein the angles are the point representing illuminant C and the points, of which the coordinates ($\lambda_D$, P) are (490, 19) and (476, 49) respectively, preferably (490, 19) and (480, 38). This corresponds to colorations which are regarded as particularly aesthetically pleasing.

Advantageously, the glass according to the invention has a dominant wavelength ($\lambda_D$) and excitation purity (P) which, in a CIE 1931 trichromatic diagram, are located inside a trapezium, wherein the angles are the points, of which the coordinates ($\lambda_D$, P) are (480, 10), (480, 38), (490, 19) and (490, 10) respectively, preferably (480, 15), (480, 38), (490, 19) and (490, 15).

The glass according to the invention preferably has a dominant wavelength of less than or equal to 489 nm.

The glass according to the invention can have an excitation purity greater than 10%, preferably greater than 15%, and preferably greater than 20%, this corresponding to particularly appreciated hues.

A coloured glass according to the invention can contain the following colouring agents, the quantity thereof being expressed as a percentage relative to the total weight of the glass and the total quantity of iron being expressed in the form of $Fe_2$:
  $Fe_2O_3$ more than or equal to 0.6% and less than 1.1%
  FeO from 0.15 to 0.35%
  Co from 0.0055 to 0.0120%.

The coloured glass having this composition of colouring agents has the following optical properties:
  35%<TLA4<60%
  15%<TE4<40%
  TUV4<25%
  481 nm<$\lambda_D$≤490 nm
  10%<P<25%.

The range of light transmission thus defined makes the glass according to the invention particularly suitable for preventing dazzling by the light of the vehicle headlights when it is used for rear side windows or as rear window in vehicles. The corresponding range of energy transmission gives the glass its high selectivity.

According to a preferred variant of the invention, the glass can contain the following colouring agents, the quantity thereof being expressed as a percentage relative to the total weight of the glass and the total quantity of iron being expressed in the form of $Fe_2O_3$:

$Fe_2O_3$ more than or equal to 0.9% and less than 1.1%
  FeO from 0.25 to 0.33%
  Co from 0.0060 to 0.0100%.

According to another preferred variant of the invention, the glass can contain the following colouring agents, the quantity thereof being expressed as a percentage relative to the total weight of the glass and the total quantity of iron being expressed in the form of $Fe_2O_3$:
  $Fe_2O_3$ from 0.6 to 0.9%
  FeO from 0.18 to 0.35%
  Co from 0.0080 to 0.0130%.

The coloured glass having these compositions of colouring agents has the following optical properties:
  35%<TLA4<55%
  20%<TE4<42%
  TUV4<30%
  479 nm<$\lambda_D$<488 nm
  15%<P<35%.

The glass according to the invention can be coated with a layer of metallic oxides, which reduce the amount to which it is heated by solar radiation and therefore reduces the heating in the passenger compartment of a vehicle using such glass for glazing.

The glasses according to the present invention can be produced by traditional processes. With respect to raw materials, it is possible to use natural materials, recycled glass, cullet or a combination of these materials. The colouring agents do not have to be added in the form indicated, but this manner of giving the added quantities of colouring agents complies with current practice. In practice, iron is added in Rouge form and cobalt in the form of hydrated sulphate such as $CoSO_4.7H_2O$ or $CoSO_4.6H_2O$.

Other elements are sometimes present as impurities in the raw materials used to manufacture the glass according to the invention, as is the case with natural materials, recycled glass and cullet, but where these impurities do not give the glass properties outside the limits defined above, these glasses are considered to be in conformity with the present invention.

The glass according to the invention preferably contains less than 2%, and preferably less than 1%, of titanium expressed by weight of $TiO_2$ relative to the total weight of glass, or even less than 0.1% of $TiO_2$. A too great quantity of $TiO_2$ poses the risk of providing the glass with a yellow coloration which is not desirable.

In contrast, the presence of $TiO_2$ has the advantage of enabling the TUV to be reduced.

DETAILED DESCRIPTION

The present invention is illustrated below on the basis of specific examples.

EXAMPLES 1 TO 49

Table I indicates the basic composition of the glass for information purposes and in a non-restrictive manner. It specifies the optical properties and proportions by weight of colouring agents of a glass according to the invention relative to the weight of this glass for information purposes and in a non-restrictive manner. These proportions are determined by X-ray fluorescence of the glass and are converted to the indicated molecular proportions. The $MnO_2$ content of examples 23 to 49 is comprised between 150 and 250 parts per million relative to the total weight of glass.

The vitrification mixture can contain, if necessary, a reducing agent such as coke, graphite or slag, or an oxidising agent such as nitrate. In this case, the proportions of the other materials are adapted so that the composition of the glass remains unchanged.

TABLE I

| BASE GLASS ANALYSIS | |
|---|---|
| $SiO_2$ | 71.5–71.9% |
| $Al_2O_3$ | 0.8% |
| CaO | 8.8% |
| MgO | 4.2% |
| $Na_2O$ | 14.1% |
| $K_2O$ | 0.1% |
| $SO_3$ | 0.05–0.45% |

TABLE II

| Ex. N° | Fe2O3 (%) | FeO (%) | $Fe^{2+}$/Fe(Tot) (%) | Co (ppm) | MnO2 (ppm) | TLA4 (%) | TE4 (%) | TUV4 (%) | SE4 | $\lambda_D$ (nm) | P (%) | Rj |
|---|---|---|---|---|---|---|---|---|---|---|---|---|
| 1 | 1.01 | 0.27 | 39 | 64 | 80 | 49.6 | 32.1 | 12.3 | 1.55 | 486 | 17.6 | 93.7 |
| 2 | 1.00 | 0.29 | 32 | 64 | 100 | 48.2 | 30.3 | 12.0 | 1.59 | 486 | 18.6 | 93.3 |
| 3 | 1.04 | 0.33 | 35 | 62 | 90 | 46.9 | 28.2 | 12.6 | 1.66 | 486 | 20.0 | 92.8 |
| 4 | 1.03 | 0.39 | 42 | 65 | 80 | 44.7 | 25.7 | 14.2 | 1.74 | 485 | 23.2 | 91.9 |
| 5 | 0.99 | 0.47 | 53 | 100 | 50 | 36.1 | 21.6 | 16.4 | 1.68 | 482 | 34.2 | 90.7 |
| 6 | 1.02 | 0.39 | 42 | 71 | 40 | 43.8 | 25.7 | 14.4 | 1.71 | 484 | 24.5 | 91.9 |
| 7 | 1.01 | 0.49 | 54 | 70 | 70 | 41.0 | 22.8 | 17.0 | 1.80 | 484 | 29.1 | 90.4 |
| 8 | 1.02 | 0.36 | 39 | 109 | 60 | 38.1 | 24.7 | 13.1 | 1.55 | 482 | 29.7 | 92.3 |
| 9 | 1.02 | 0.46 | 50 | 69 | 110 | 44.7 | 26.1 | 12.9 | 1.71 | 485 | 22.5 | 91.1 |
| 10 | 0.90 | 0.22 | 27 | 58 | 60 | 52.8 | 36.9 | 16.6 | 1.43 | 485 | 15.5 | |
| 11 | 0.89 | 0.23 | 29 | 62 | 80 | 51.7 | 36.6 | 17.0 | 1.41 | 485 | 16.5 | |
| 12 | 0.85 | 0.27 | 35 | 65 | 70 | 49.7 | 33.5 | 19.2 | 1.48 | 484 | 20.3 | |
| 13 | 0.91 | 0.31 | 38 | 71 | 60 | 45.6 | 28.9 | 16.9 | 1.58 | 484 | 22.4 | |
| 14 | 0.95 | 0.30 | 35 | 63 | 90 | 47.8 | 29.7 | 15.2 | 1.61 | 485 | 20.2 | |
| 15 | 0.98 | 0.31 | 35 | 58 | 60 | 48.4 | 28.9 | 14.0 | 1.67 | 486 | 19.3 | |
| 16 | 0.61 | 0.23 | 42 | 60 | 50 | 54.3 | 37.9 | 26.6 | 1.43 | 483 | 20.2 | |
| 17 | 0.65 | 0.25 | 43 | 62 | 80 | 52.5 | 35.7 | 25.0 | 1.47 | 484 | 20.9 | |
| 18 | 0.67 | 0.25 | 41 | 60 | 70 | 53.3 | 36.4 | 24.1 | 1.46 | 484 | 20.0 | |
| 19 | 0.72 | 0.28 | 43 | 62 | 60 | 50.6 | 32.6 | 22.2 | 1.55 | 484 | 21.3 | |
| 20 | 0.74 | 0.27 | 40.5 | 61 | 90 | 51.2 | 33.5 | 21.3 | 1.53 | 484 | 20.5 | |
| 21 | 0.78 | 0.27 | 38 | 70 | 100 | 48.3 | 32.4 | 19.6 | 1.49 | 484 | 21.9 | |
| 22 | 0.81 | 0.35 | 48 | 65 | 80 | 45.8 | 25.6 | 18.9 | 1.79 | 484 | 23.6 | |
| 23 | 0.78 | 0.31 | 44 | 115 | | 41.9 | 28.3 | 22.1 | 1.48 | 480.6 | 31.0 | |
| 24 | 0.8 | 0.29 | 40 | 100 | | 45.1 | 30.9 | 20.9 | 1.46 | 481.5 | 26.8 | |
| 25 | 0.825 | 0.26 | 35 | 80 | | 49.4 | 34.2 | 19.3 | 1.45 | 483.1 | 21.4 | |
| 26 | 0.85 | 0.23 | 30 | 75 | | 51.2 | 36.5 | 17.8 | 1.40 | 483.8 | 18.7 | |
| 27 | 0.875 | 0.24 | 30 | 65 | | 52.4 | 36.4 | 17.0 | 1.44 | 485.0 | 16.9 | |
| 28 | 0.85 | 0.27 | 35 | 130 | | 40.5 | 30.3 | 19.2 | 1.34 | 480.2 | 30.6 | |
| 29 | 0.825 | 0.33 | 45 | 90 | | 45.0 | 28.1 | 20.8 | 1.60 | 482.2 | 26.7 | |
| 30 | 0.79 | 0.32 | 45 | 130 | | 38.9 | 26.6 | 22.2 | 1.46 | 480.1 | 34.2 | |
| 31 | 0.83 | 0.34 | 46 | 87 | | 45.1 | 27.6 | 20.7 | 1.63 | 482.5 | 26.5 | |
| 32 | 0.71 | 0.22 | 35 | 80 | | 51.7 | 37.4 | 22.4 | 1.38 | 482.5 | 21.5 | |
| 33 | 0.69 | 0.28 | 45 | 130 | | 40.8 | 29.4 | 24.9 | 1.39 | 479.5 | 34.3 | |
| 34 | 0.75 | 0.27 | 40 | 100 | | 46.1 | 32.3 | 22.2 | 1.43 | 481.2 | 26.9 | |
| 35 | 0.65 | 0.23 | 39 | 89 | | 50.2 | 36.4 | 24.7 | 1.38 | 481.1 | 24.6 | |
| 36 | 0.61 | 0.21 | 38 | 82 | | 52.4 | 38.5 | 25.5 | 1.36 | 481.3 | 23.0 | |
| 37 | 0.75 | 0.29 | 43 | 98 | | 45.5 | 30.7 | 22.5 | 1.48 | 481.3 | 27.6 | |
| 38 | 0.73 | 0.26 | 39 | 126 | | 42.4 | 31.8 | 22.9 | 1.33 | 479.7 | 31.4 | |
| 39 | 0.76 | 0.29 | 42 | 114 | | 43.0 | 30.1 | 22.4 | 1.43 | 480.5 | 30.2 | |
| 40 | 0.64 | 0.22 | 39 | 86 | | 50.9 | 36.9 | 24.9 | 1.38 | 481.2 | 24.1 | |
| 41 | 0.63 | 0.20 | 35 | 80 | | 53.2 | 39.7 | 24.5 | 1.34 | 481.5 | 21.6 | |
| 42 | 0.65 | 0.18 | 31 | 85 | | 53.1 | 41.0 | 23.5 | 1.30 | 481.4 | 21.1 | |
| 43 | 0.69 | 0.21 | 34 | 90 | | 50.6 | 37.9 | 22.9 | 1.34 | 481.3 | 23.0 | |
| 44 | 0.73 | 0.23 | 35 | 92 | | 49.2 | 36.1 | 22.0 | 1.36 | 481.5 | 23.7 | |
| 45 | 0.76 | 0.225 | 33 | 94 | | 48.9 | 36.2 | 20.9 | 1.35 | 481.6 | 23.3 | |
| 46 | 0.79 | 0.27 | 38 | 92 | | 47.2 | 32.8 | 20.8 | 1.44 | 481.9 | 24.7 | |
| 47 | 0.83 | 0.26 | 35 | 90 | | 47.6 | 33.4 | 19.3 | 1.43 | 482.4 | 23.2 | |
| 48 | 0.86 | 0.27 | 35 | 83 | | 48.2 | 33.0 | 18.4 | 1.46 | 483.1 | 21.9 | |
| 49 | 0.88 | 0.28 | 35 | 90 | | 46.7 | 32.0 | 17.9 | 1.46 | 482.7 | 23.2 | |

What is claimed is:

1. Colored soda-lime glass comprising the main glass-forming constituents and coloring agents, characterised in that it comprises:
   i) a quantity of MgO expressed relative to the total weight of glass which is more than 2%,
   ii) a quantity of $MnO_2$ expressed relative to the total weight of glass which is from 40 to 250 parts per million,
   iii) a quantity of $Fe_2O_3$ expressed relative to the total weight of glass which is less than 1.1%, the total quantity of iron being expressed in the form of $Fe_2O_3$,
   iv) a quantity of Co expressed relative to the total weight of glass which is more than 55 parts per million, and in that it has
   v) a selectivity (SE4) greater than 1.2,
   vi) a dominant wavelength ($\lambda_D$) less than or equal to 490 nm, and
   vii) excitation purity (P) greater than 10%.

2. Colored glass according to claim 1, characterised in that it includes at least one of the following features (A) through (M):
   (A) it has a rendition index for the colour yellow (Rj) of >98.5−0.74×P;
   (B) it contains ferrous iron in a quantity, expressed in the weight of atoms of $Fe^{2+}$ relative to the total weight of iron atoms present in the glass, which is greater than 28% ($Fe^{2+}$/total Fe ratio);
   (C) it has a dominant wavelength ($\lambda_D$) of less than 489 nm;
   (D) it has an excitation purity higher than 15%;
   (E) it has a selectivity (SE4) greater than 1.4;
   (F) it comprises a quantity of Co expressed relative to the total weight of glass which is more than 60 parts per million;
   (G) it has a TUV4 of less than 30%;
   (H) it has a TLA4 of less than 70%;
   (I) it comprises a quantity of $Fe_2O_3$ expressed relative to the total weight of glass which is more than 0.5%;
   (J) it has a dominant wavelength ($\lambda_D$) and excitation purity (P) which, in a 1931 CIE trichromatic diagram, are located inside a triangle, wherein the angles are the point representing illuminant C and the points, of which the coordinates ($\lambda_D$, P) are (490, 19) and (476, 49) respectively;
   (K) it comprises the following colouring agents, the quantity thereof being expressed as a percentage relative to the total weight of the glass and the total quantity of iron being expressed in the form of $Fe_2O_3$:
   $Fe_2O_3$ more than or equal to 0.6% and less than 1.1%
   FeO from 0.15 to 0.35%
   Co from 0.0055 to 0.0120%;
   (L) it has the following optical properties:
   35%<TLA4<60%
   15%<TE4<40%
   TUV4<25%
   481 nm<$\lambda_D$<490 nm
   10%<P<25%;
   (M) it comprises a quantity of $TiO_2$ expressed relative to the total weight of glass, which is less than 2%.

3. Colored glass according to claim 2, characterised in that it includes at least two of the aforementioned features (A) through (M).

4. Colored glass according to claim 2, characterised in that it includes at least three of the aforementioned features (A) through (M).

5. Colored glass according to claim 2, characterised in that it includes at least four of the aforementioned features (A) through (M).

6. Colored glass according to claim 2, characterised in that it includes at least five of the aforementioned features (A) through (M).

7. Colored glass according to claim 2, characterised in that it includes all of the aforementioned features (A) through (M).

8. Colored glass according to claim 2, further characterised in that when feature (B) is selected, the amount of ferrous iron is greater than 32%.

9. Colored glass according to claim 2, further characterised in that when feature (E) is selected, SE4 is greater than 1.5.

10. Colored glass according to claim 2, further characterised in that when feature (H) is selected, TLA4 is less than 65%.

11. Colored glass according to claim 2, further characterised in that when feature (H) is selected, TLA4 is less than 60%.

12. Colored glass according to claim 2, further characterised in that when feature (I) is selected, the quantity of $Fe_2O_3$ is more than 0.6%.

13. Colored glass according to claim 2, further characterised in that when feature (I) is selected, the quantity of $Fe_2O_3$ is more than 0.7%.

14. Colored glass according to claim 2, further characterised in that when feature (J) is selected, it has a dominant wavelength ($\lambda_D$) and excitation purity (P) which, in a CIE 1931 trichromatic diagram, are located inside a triangle, wherein the angles are the point representing illuminant C and the points, of which the coordinates ($\lambda_D$, P) are (490, 19) and (480, 38) respectively.

15. Colored glass according to claim 2, further characterised in that when feature (K) is selected, the quantity of colouring agents being expressed as a percentage relative to the total weight of the glass and the total quantity of iron being expressed in the form of $Fe_2O_3$ are:
   $Fe_2O_3$ more than or equal to 0.9% and less than 1.1%
   FeO from 0.25 to 0.33%
   Co from 0.0060 to 0.0100%.

16. Colored glass according to claim 15, characterised in that it has the following optical properties:
   35%<TLA4<55%
   20%<TE4<42%
   TUV4<30%
   479 nm<$\lambda_D$<488 nm
   15%<P<35%.

17. Colored glass according to claim 2, further characterised in that when feature (I) is selected, the quantity of colouring agents being expressed as a percentage relative to the total weight of the glass and the total quantity of iron being expressed in the form of $Fe_2O_3$ are:
   $Fe_2O_3$ from 0.6% to 0.9%;
   FeO from 0.18 to 0.35%
   Co from 0.0080 to 0.0130%.

18. Colored glass according to claim 17, characterised in that it has the following optical properties:
   35%<TLA4<55%
   20%<TE4<42%
   TUV4<30%
   479 nm<$\lambda_D$<488 nm
   15%<P<35%.

19. Colored glass according to claim 2, further characterised in that when feature (M) is selected, the quantity of $TiO_2$ expressed relative to the total weight of glass, is less than 1%.

20. Colored glass according to claim 2, further characterised in that when feature (M) is selected, the quantity of $TiO_2$ expressed relative to the total weight of glass, is less than 0.1%.

21. Colored glass according to claim 1, characterised in that it forms part of the composition of glazing for vehicles.

* * * * *